(12) United States Patent
Leyden

(10) Patent No.: US 10,963,876 B2
(45) Date of Patent: Mar. 30, 2021

(54) SECURITY SYSTEM FOR EPOS TERMINAL

(71) Applicant: Se-Kure Controls, Inc., Franklin Park, IL (US)

(72) Inventor: Roger J. Leyden, Inverness, IL (US)

(73) Assignee: Se-Kure Controls, Inc., Franklin Park, IL (US)

( * ) Notice: Subject to any disclaimer, the term of this patent is extended or adjusted under 35 U.S.C. 154(b) by 208 days.

(21) Appl. No.: 15/957,285

(22) Filed: Apr. 19, 2018

(65) Prior Publication Data
US 2018/0322494 A1 Nov. 8, 2018

Related U.S. Application Data

(60) Provisional application No. 62/501,532, filed on May 4, 2017.

(51) Int. Cl.
| | |
|---|---|
| G06Q 40/00 | (2012.01) |
| G06K 5/00 | (2006.01) |
| G06Q 20/40 | (2012.01) |
| G06Q 20/34 | (2012.01) |
| G06Q 20/20 | (2012.01) |
| G06F 21/86 | (2013.01) |
| G06Q 20/32 | (2012.01) |
| G07G 1/00 | (2006.01) |
| G07F 19/00 | (2006.01) |

(52) U.S. Cl.
CPC .......... *G06Q 20/401* (2013.01); *G06F 21/86* (2013.01); *G06Q 20/20* (2013.01); *G06Q 20/3227* (2013.01); *G06Q 20/34* (2013.01); *G07F 19/2055* (2013.01); *G07G 1/0018* (2013.01)

(58) Field of Classification Search
USPC ......................................... 235/380, 383, 379
See application file for complete search history.

(56) References Cited

U.S. PATENT DOCUMENTS

| | | | | |
|---|---|---|---|---|
| 5,408,382 A * | 4/1995 | Schultz | ................... | B60R 11/02 361/679.41 |
| 8,240,566 B1 * | 8/2012 | Criscitiello | .......... | G06K 7/0078 235/439 |
| 8,523,072 B2 * | 9/2013 | Randolph | ............ | G06K 7/0056 235/380 |
| 9,525,689 B2 * | 12/2016 | Batta | ................. | H04W 12/1204 |
| 2002/0156683 A1 * | 10/2002 | Stoutenburg | ........... | G06Q 20/04 705/16 |
| 2007/0040023 A1 * | 2/2007 | Ruggirello | ............ | G07F 19/207 235/382 |

(Continued)

*Primary Examiner* — Tuyen K Vo
(74) *Attorney, Agent, or Firm* — Wood, Phillips, Katz, Clark & Mortimer

(57) ABSTRACT

The combination of an EPOS terminal and a security system. The terminal has a housing with a reader for identifying information on a user card. The housing has an external surface defining an original outer configuration. The security system has at least one component configured to be fixed to the housing. The at least one component substantially effectively alters a contour of the original outer configuration of the external surface so as to block placement of a skin, with a skimming component and at least nominally matched in shape to at least a portion of the original outer configuration of the external surface, conformingly over the external surface of the housing.

17 Claims, 7 Drawing Sheets

(56) References Cited

U.S. PATENT DOCUMENTS

| | | | | |
|---|---|---|---|---|
| 2013/0046697 A1* | 2/2013 | Schibuk | ............ | G06Q 20/32 |
| | | | | 705/67 |
| 2013/0262248 A1* | 10/2013 | Kim | ............ | G07F 7/088 |
| | | | | 705/17 |
| 2015/0001291 A1* | 1/2015 | Govindarajan | ...... | G06Q 20/208 |
| | | | | 235/380 |
| 2017/0161704 A1* | 6/2017 | Rimer | ............ | A47F 9/00 |

* cited by examiner

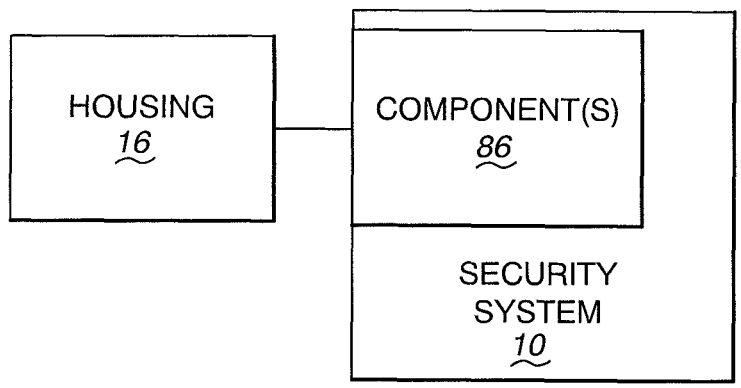
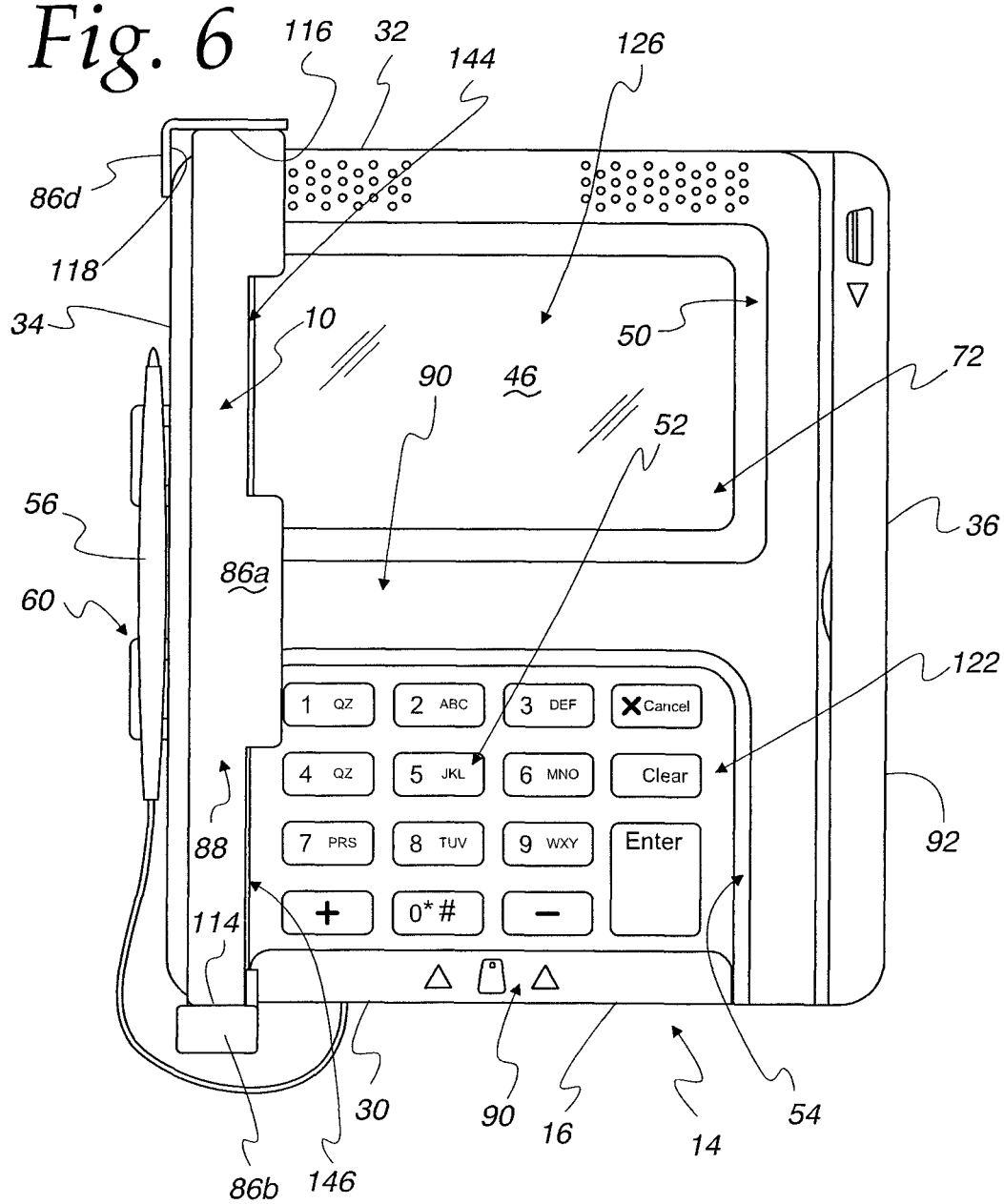

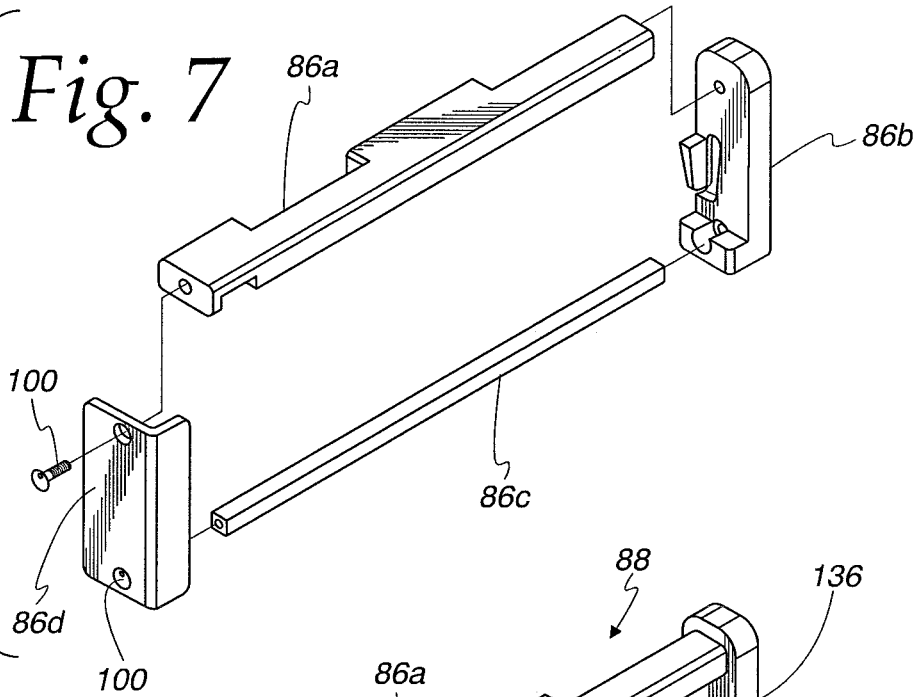
Fig. 7
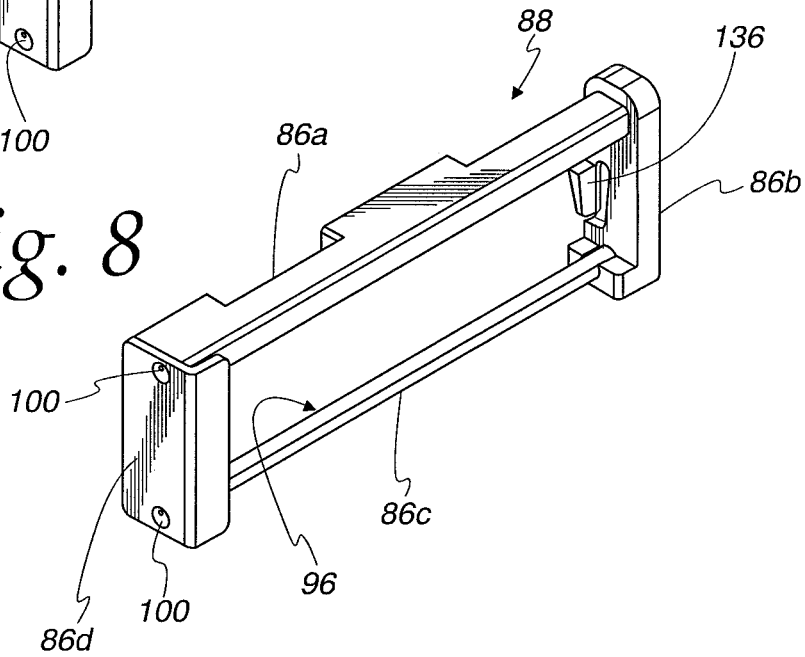
Fig. 8
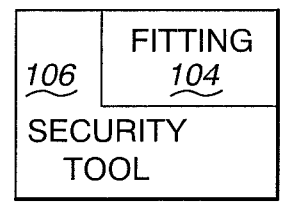
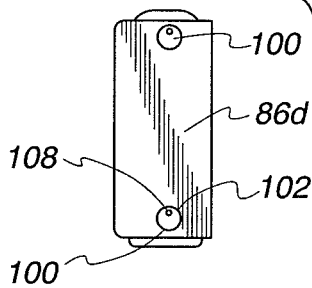
Fig. 9

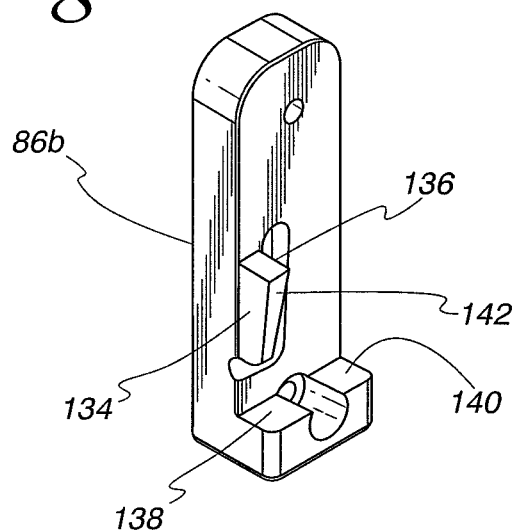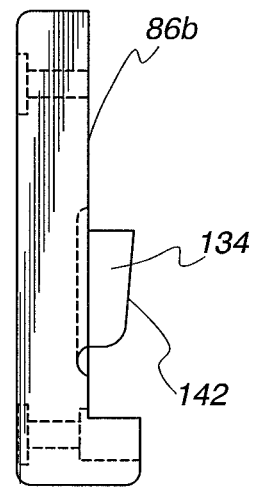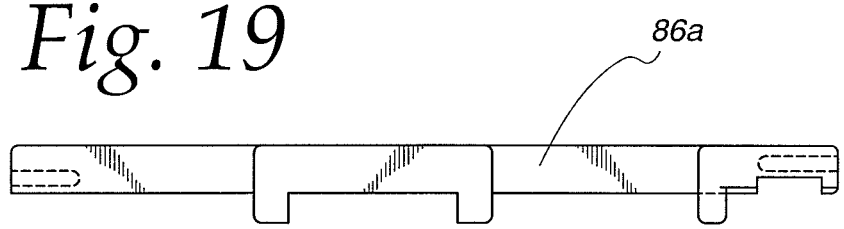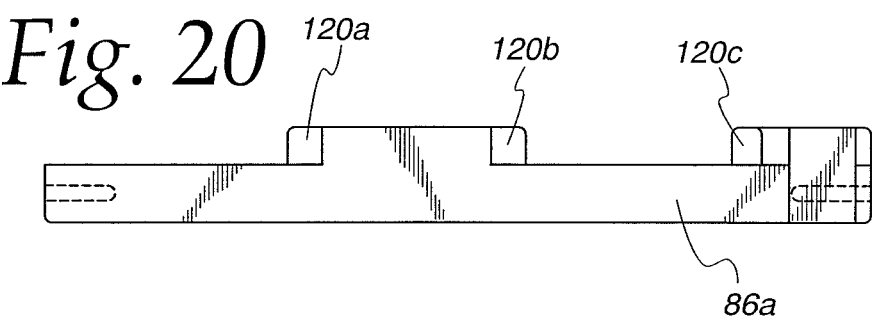

SECURITY SYSTEM FOR EPOS TERMINAL

CROSS-REFERENCE TO RELATED APPLICATIONS

This is a non-provisional application claiming priority to U.S. Provisional Application No. 62/501,532, filed May 4, 2017.

BACKGROUND OF THE INVENTION

Field of the Invention

This invention relates to electronic point-of-sale (EPOS) terminals as used at checkout locations in retail establishments and, more particularly, to a security system that interferes with tampering with the EPOS terminal in a manner that would allow credit card skimming.

Background Art

EPOS digital sales terminals are used in businesses worldwide to process debit and credit card transactions. A typical EPOS terminal consists of a housing with a keypad and a scanning slot which allows reading of information on magnetic strips typically placed on such cards. EPOS terminals are being upgraded to process cards using chip technology. However, card scanning slots remain on virtually all EPOS terminals, with it anticipated that this configuration will continue to be used into the future at least until card processing uses only chip technology.

Card skimming has become a huge financial concern for all businesses and card companies that participate in transactions using information read from a user card. Thieves have devised numerous ways to extract magnetically stored data from cards, recently particularly focusing on doing so at the time a card is being processed, as at an EPOS terminal.

To accomplish this end, thieves have modified conventional EPOS terminals in a manner that allows recoverable storage of card information and/or immediate transmission of the information for use by an unauthorized recipient at the time of a transaction. Different approaches have been taken to accomplish this.

One growing trend involves the placement of a "skin" on the EPOS terminal with an independent capability to store and/or transmit magnetically stored data read from a user card. The skins are constructed to closely conform to the external surfaces of the EPOS terminal housings and are often undetectable other than by close and careful inspection by an attendant, such as a cashier.

Many security videos have recorded actions of thieves in modifying EPOS terminals for skimming. Commonly, an attendant will be distracted, causing him/her to turn away from the EPOS terminal. In a matter of literally seconds, a skin can be pressed onto the housing at the EPOS terminal that incorporates all of the mechanical and electronic structure required to independently copy the card information and/or effect its transmission for use or reproduction, as at a remote location. The re-engaged attendant is unlikely to detect the presence of the skin, potentially even with a somewhat careful inspection of the terminal housing.

In spite of the growth of this trend, and the enormous amounts of money that are being stolen as a result, the industry has taken no significant steps to prevent this type of theft, other than training personnel to be more diligent in watching patrons and inspecting terminals periodically for tampering. As a practical matter, particularly given the difficulty in detecting such tampering, such steps have been ineffective. The industry continues to be in need of some practical system to limit, or altogether stop, such activity.

SUMMARY OF THE INVENTION

In one form, the invention is directed to the combination of: a) an EPOS terminal configured to process a user input through at least one of a debit and a credit card; and b) a security system. The EPOS terminal has a housing with a reader for identifying information on a user's debit or credit card usable to carry out a transaction. The housing has an external surface defining an original outer configuration. The security system has at least one component configured to be fixed to the housing with the security system in an operative state. The at least one component substantially effectively alters a contour of the original outer configuration of the external surface so as to block placement of a skin, with a skimming component at least nominally matched in shape to at least a portion of the original outer configuration of the external surface, conformingly over the external surface of the housing.

In one form, the housing has a slot to guide sliding movement of a debit or credit card in a predetermined manner to allow information on the credit or debit card to be identified by the reader.

In one form, the housing external surface includes an upper surface area. With the security system in the operative state, the at least one component projects upwardly from the upper surface area.

In one form, the housing external surface includes a peripheral surface area between upper and lower surface areas. With the security system in the operative state, the at least one component projects outwardly from the peripheral surface area.

In one form, with the security system in the operative state, the at least one component extends continuously around a part of the housing.

In one form, the at least one component has at least first and second components that are connected to each other to captively engage the housing with the security system in the operative state.

In one form, the housing has a front and rear, laterally spaced sides, a top, and a bottom. With the security system in the operative state: a) a first part of the housing is captive between oppositely facing surfaces on the at least one component to confine relative lateral movement between the housing and a first part of the security system; b) a second part of the housing is captive between oppositely facing surfaces on the at least one component to confine relative fore-and-aft movement between the housing and a second part of the security system; and c) a third part of the housing is captive between oppositely facing surfaces on the at least one component to confine relative up and down movement between the housing and a third part of the security system.

In one form, the EPOS terminal has an electronic screen with a framing edge around the electronic screen. The first part of the housing is bounded by a part of the framing edge.

In one form, the at least one component has a plurality of joined components that cooperatively extend continuously around a rectangular space within which a part of the housing resides with the security system in the operative state.

In one form, the security system is made up of a plurality of components fixed together using threaded fasteners.

In one form, the threaded fasteners each has a turning head with a configuration to cooperate with a security tool having a customized fitting to make a keyed connection with the turning head.

In one form, the invention described above is provided in combination with the security tool.

In one form, the EPOS terminal has an electronic screen with a framing edge around the electronic screen and a keypad with a framing edge around the keypad. The second part of the housing is defined between parts of each of the framing edges around the electronic screen and the keypad.

In one form, the third part of the housing is defined between oppositely facing top and bottom surfaces of the housing.

In one form, the second part of the housing is defined between oppositely facing front and rear surfaces of the housing.

In one form, the housing has an undercut region at the top of the housing at which a keypad is formed bounded by a framing edge. The first part of the housing is bounded by a part of the framing edge.

In one form, the first part of the housing is bounded by a surface at one side of the housing.

In one form, the EPOS terminal has a holder on the housing with a receptacle into which a stylus can be releasably placed in a stored position and separated for use. The security system is configured so that in the operative state the security system does not obstruct placement of a stylus into, and removal of a stylus from, the housing receptacle.

In one form, the EPOS terminal has an electronic screen and is provided in combination with the stylus that is configured to cooperate with the electronic screen to perform a processing operation through the electronic screen.

BRIEF DESCRIPTION OF THE DRAWINGS

FIG. 5 is a schematic representation showing further details of the inventive security system in FIG. 1;

FIG. 6 is a view of the EPOS terminal, as in FIG. 2, with one form of the inventive security system, as shown schematically in FIGS. 1 and 5, in an operative state thereon;

FIG. 7 is an exploded, perspective view of a frame structure with multiple components that make up the inventive security system;

FIG. 8 is a view as in FIG. 7 with the components in an assembled state;

FIG. 9 is a rear elevation view of the frame structure in FIG. 8 shown with a separate security tool for turning threaded fasteners that hold the components together;

FIG. 17 is an enlarged, perspective view of a third component making up the frame structure in FIG. 8;

FIG. 18 is an enlarged, side elevation view of the component in FIG. 17;

FIG. 19 is an enlarged, plan view of a fourth component making up the frame structure in FIG. 8; and FIG. 20 is an enlarged, bottom view of the component in FIG. 19.

DETAILED DESCRIPTION OF THE PREFERRED EMBODIMENT

Figure 1:
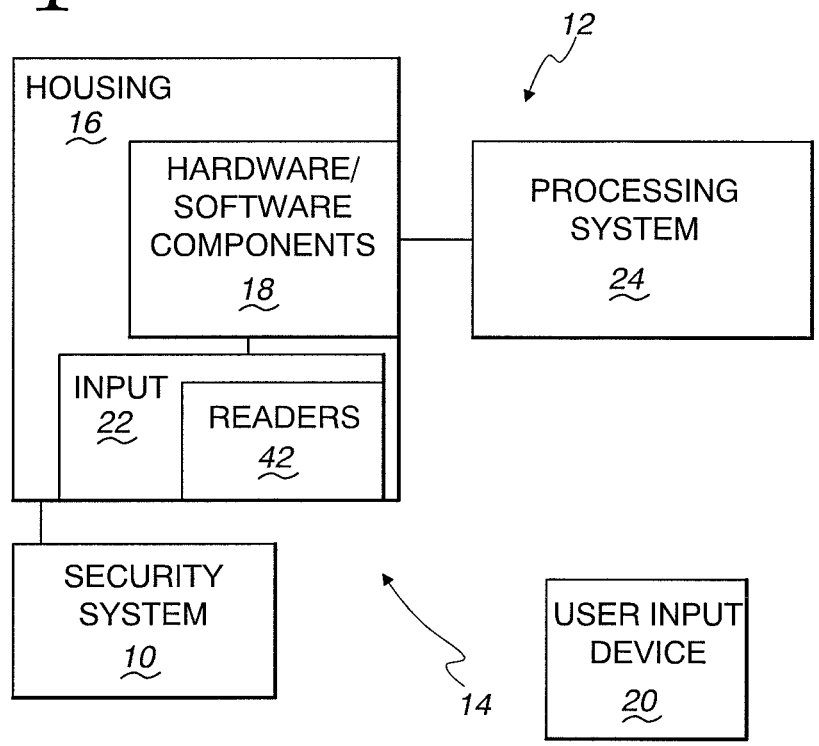
FIG. 1 is a schematic representation of a security system, according to the invention, associated with a conventional type EPOS system including a terminal housing at which a user inputs transactional information.

As shown schematically in FIG. 1, the present invention is directed to a security system 10 for use in conjunction with an EPOS system at 12. EPOS digital systems are commonly used in retail establishments worldwide to allow consumers to transfer funds and/or pay for goods or services electronically, using debit cards, credit cards, etc. The details of the construction and operation of the EPOS system 12 need not be described herein to understand the present invention. It suffices to say that the EPOS system 12 will typically incorporate a terminal 14 with a housing 16 that has certain hardware/software components 18 that will process information carried on a user input device 20, typically in the form of a credit or debit card. The information on the user input device 20 may be stored on a chip or readable from a magnetic strip, as commonly on credit and debit cards. Inputs using bar scanning and other technology are contemplated.

The housing 16 has an input at 22 capable of cooperating with the user input device 20 to read the information thereon. The information that is read at the input 22 is processed using the hardware/software components 18 that make up at least part of, or cooperate with, a separate processing system 24. The overall processing may occur internally at a business or, more commonly, will be coordinated with a separate financial institution, or other entity, to complete a transaction.

The generic showing of components in FIG. 1 is intended to encompass virtually any type of EPOS system that involves transfer of information from a user input device 20 to the appropriate processing components to complete a transaction using that information. The user input device 20 may be controlled by a consumer directly at the terminal 14 or with the assistance of an attendant.

While the inventive concepts can be used to originally manufacture a terminal that is highly resistant to card "skimming", the invention has particular utility in retrofitting terminal housings that are currently in existence on a wide scale basis in retail establishments worldwide.

Figure 4:
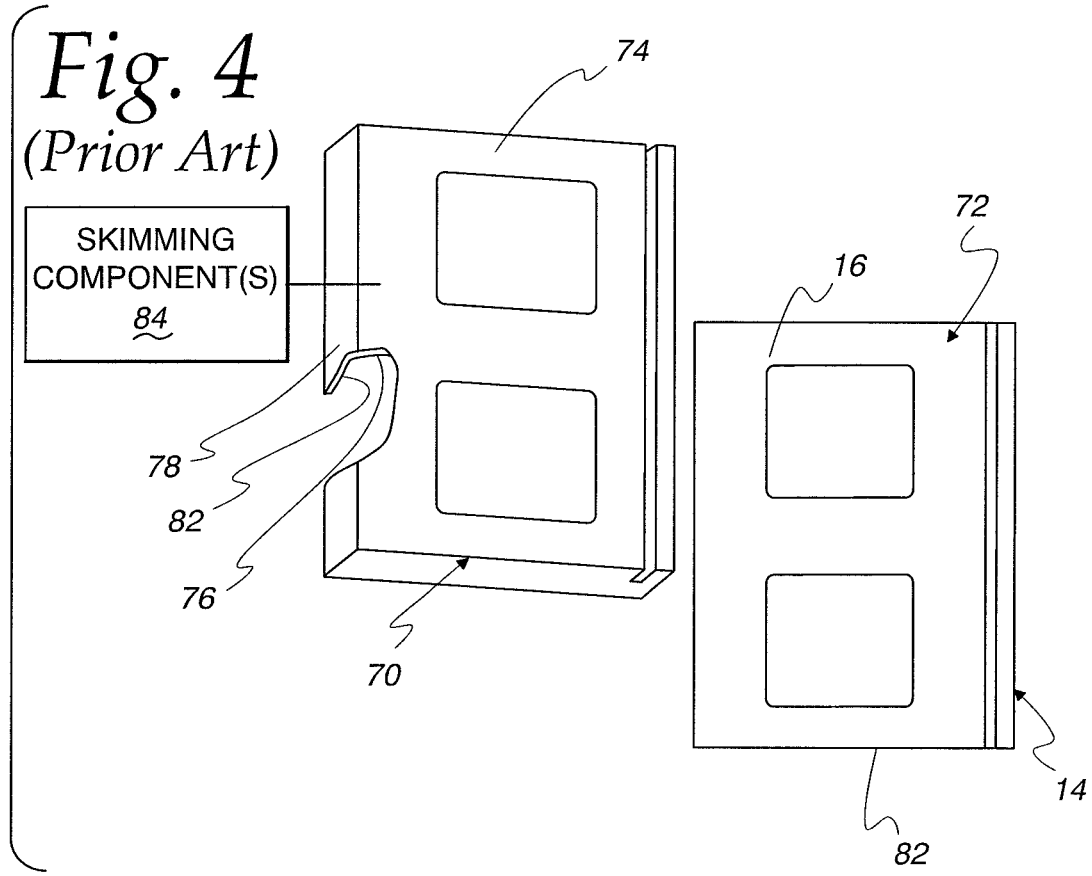
FIG. 4 is a reduced, plan view of the EPOS terminal in FIGS. 2 and 3 in relationship to a skin, connectable to the EPOS terminal housing and usable to compromise the EPOS terminal function.
Figure 2:
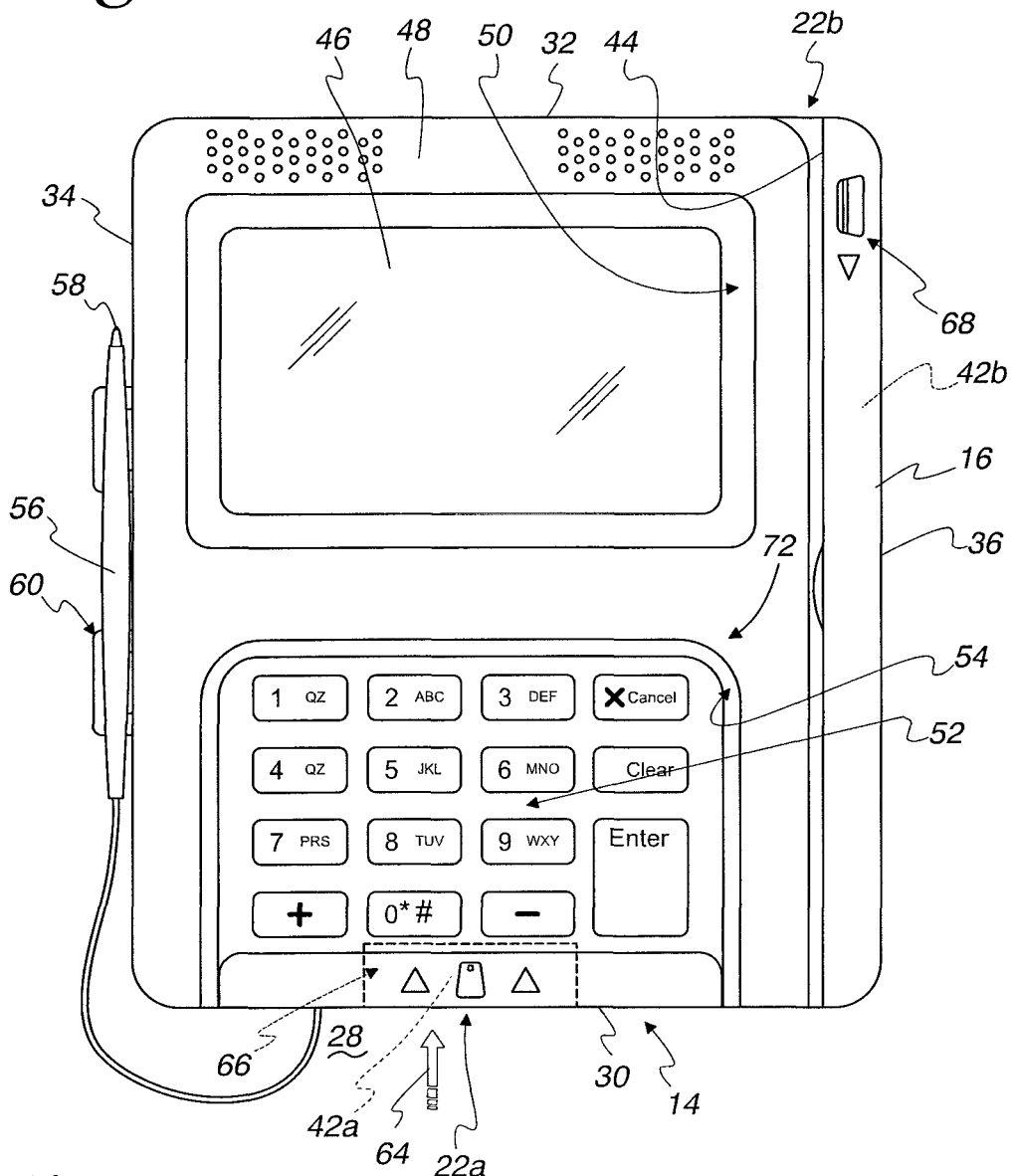
FIG. 2 is a plan view of an exemplary form of a prior art EPOS terminal with a housing, as shown schematically in FIG. 1.
Figure 3:
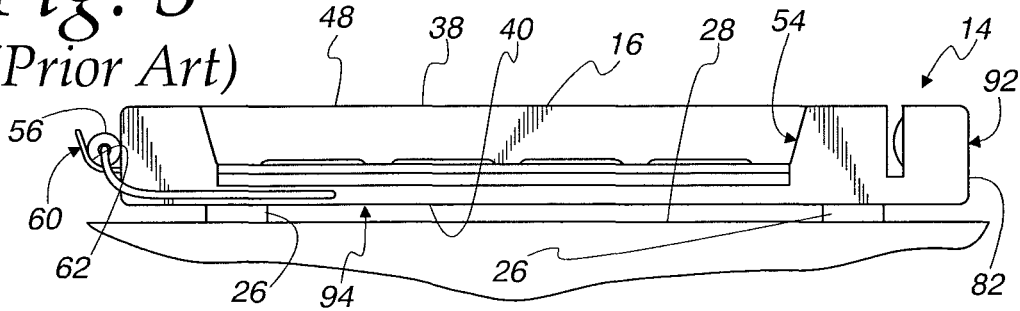
FIG. 3 is a front elevation view of the EPOS terminal in FIG. 2.

An exemplary, existing EPOS terminal construction is shown in FIGS. 2-4 at 14. The terminal 14 has the aforementioned housing 16, typically with support pads 26 through which the housing 16 is maintained in an operative position on a support surface 28.

The housing 16 has a front 30, a rear 32, laterally spaced sides 34, 36, a top 38, and a bottom 40.

The depicted terminal 14 has separate card inputs 22*a*, 22*b* for the user input devices 20. As shown schematically in FIG. 1, at each input 22, a reader 42 is provided to obtain the information on the user input device 20. These readers 42 have a conventional construction. At the location 22*a*, a reader 42*a* is provided to obtain information through a chip, whereas at the input 22*b* a reader 42*b* is provided to obtain information from a magnetic strip as it is passed through a slide/swipe slot 44.

To assist processing of the information on the user input device 20 to complete a transaction, the depicted terminal 14 has an electronic screen 46 that is recessed below an upper surface 48 of the housing 16. A framing edge 50 extends around the electronic screen 46. The framed electronic screen 46 has a rectangular shape, though this is not required.

A keypad 52 is also recessed from the upper surface 48, resides forwardly of the electronic screen, and has a similar framing edge 54 with a rectangular shape therearound.

A tethered stylus 56 has a tip 58 configured to cooperate with the electronic screen 46 to perform a processing operation through the electronic screen 46 in conventional manner.

A holder 60 is provided at the housing side 34. The holder 60 defines a receptacle 62 into which the stylus 56 can be placed in a stored position, as shown in FIG. 2. The stylus can be separated for use in a well-known manner.

To use the chip reader 42*a*, the user input device 20 is pressed in the direction of the arrow 64 into a slot 66 at the front of the housing 16.

To use a magnetic strip on the user input device 20, the user input device 20 is introduced at the rear of the housing 16 to the slot 44 and slid/swiped in a forward direction as prompted by the icon 68.

FIG. 4 shows a rough representation of a skin 70 as used to modify the terminal 14 in a manner that permits "skimming".

The housing 16 on the terminal 14 has an overall external, surface 72 that is exposed and defines its original outer configuration. The skin 70 has at least one body 74 with an underside surface 76 that overlies at least a part of the surface 72 and is configured to be placed conformingly thereover. The surface 76 is nominally matched in shape to at least a portion of the original outer configuration of the external surface 72. As depicted, a peripheral, depending frame 78 has a surface 80 that wraps, potentially conformingly, around the peripheral surface portion 82 of the housing 16.

The skins 70, while not of a single shape or configuration, are generally constructed so that they not only nominally conform to the exposed surface 72 but allow a replicated appearance of the original housing 16, thereby giving a user the impression that the EPOS terminal 14 is in an uncompromised state. This end can be achieved by strategically permitting certain regions of the exposed surface 72 to remain visible, as through cutouts or transparencies in the skin 70. A full obscuring of the external surface under the skin 70 might also be accomplished.

The skin 70 is also constructed so that the basic operation of the input terminal 14 appears to be unchanged. Thus, unsuspecting users may input information through the user input device 20 in normal manner and operate the keypad 52 and electronic screen 46 without any awareness of a problem. However, as shown schematically in FIG. 4, the skin 70 incorporates at least one skimming component 84 that captures the information from the user input device 20 for use by the tampering entity. The skimming component(s) 84 might be nothing more than a storage device for the information, which can then be retrieved with the skin 70. Alternatively, the skimming component(s) may cause transmission of the information to a device on site or at another location, or cause immediate processing that exploits the user's information in other ways. Diversion of monies, accessing of accounts, etc., might be accomplished through the skimming process.

As shown schematically in FIG. 5, the inventive security system 10 is made up of at least one component 86 that is configured to be fixed to the housing 16, with the security system in an operative state. The at least one component 86 substantially effectively alters a contour of the original outer configuration of the exposed external surface 72 to thereby interfere with placement of a skin 70, as shown in FIG. 4 with a skimming component 84 and matched generally to the original outer configuration of the exposed external surface 72, conformingly over the exposed external surface 72 of the housing 16.

The schematic showing in FIG. 5 is intended to encompass virtually an unlimited number of different security system configurations that would be operational to prevent placement of a skin 70 in a manner whereby its presence is, for all practical purposes, undetectable, and which at the same time allows basic manipulation of the components on the EPOS terminal 14 in a perceived normal manner. By blocking the complete seating of the skin 70 in its intended final position, it becomes more evident to a user/attendant that the terminal 14 has been tampered with, which raises immediate suspicion of possible compromising of financial information. The blocked skin 70 may be only partially seated or skewed in a manner whereby it not only appears to be improperly seated, but potentially interferes with other basic operations of the terminal 14, as through the electronic screen 46 and keypad 52, and/or interferes with access to the stylus 56, etc.

One specific form of the security system 10 will now be described, with it being understood that this is but exemplary of the many different forms contemplated within the schematic showing of FIGS. 1 and 5. The exemplary form of the security system is shown in FIGS. 6-20 in association with the housing 16 on the terminal 14.

While the security system 10 could take a number of much simpler forms, in the depicted preferred form, a unitary frame structure is provided at 88 that extends continuously around a part of the terminal housing 16 and cooperates therewith so as to be blocked against movement relative to the housing 16: a) in a fore-and-aft direction; b) in laterally opposite directions; and c) in up-and-down directions, with the security system 10 in the operative state as shown in FIG. 6. As depicted, the frame structure 88 extends continuously around the housing 16 adjacent to the frame side 34 and projects upwardly from the upper surface area 90 that defines part of the exposed exterior surface at 72.

Figure 10:
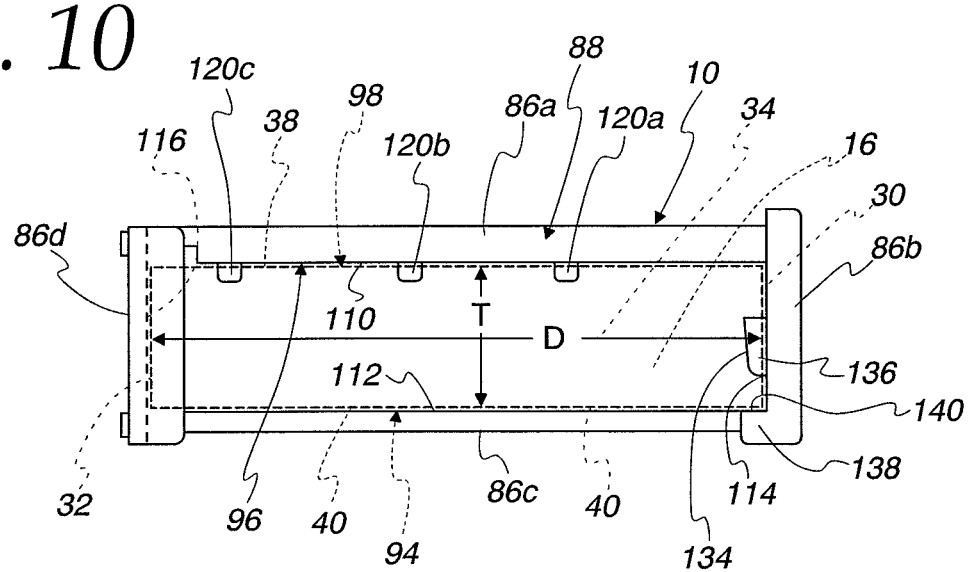
FIG. 10 is a side elevation view of the frame structure in FIG. 8 and with a surrounded part of the EPOS terminal housing.
Figure 11:
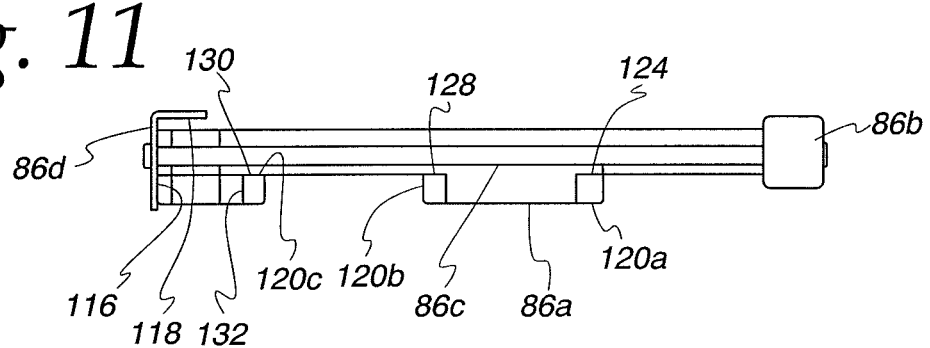
FIG. 11 is a bottom view of the frame structure in FIG. 8.
Figure 12:
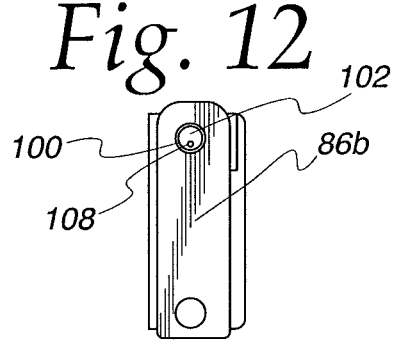
FIG. 12 is a front elevation view of the frame structure in FIG. 8.
Figure 13:
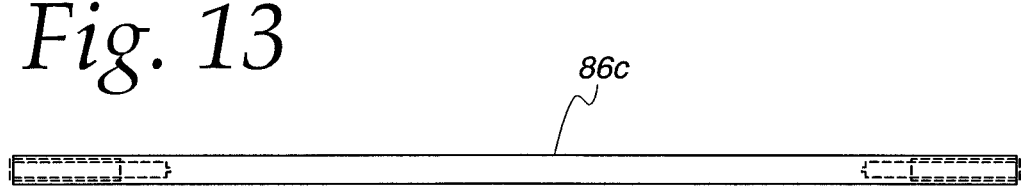
FIG. 13 is an enlarged, elevation view of one of the components making up the frame structure in FIG. 8.

The exposed external surface 72 includes a peripheral surface area at 92 between the upper surface area 90 and a lower surface area at 94 (FIG. 10). With the security system 10 in the operative state of FIG. 6, the frame structure 88 projects outwardly from the peripheral surface area 92 at the housing front 30 and the housing rear 32.

The frame structure 88 consists of four primary components 86*a*, 86*b*, 86*c*, 86*d*. The components 86*a*-86*d* are joined, as shown most clearly in FIGS. 8 and 10, to cooperatively extend continuously around a rectangular space 96 within which a part 98 of the housing 16 resides with the security system 10 in its operative state. The surrounded housing part 98 consists of the full fore-and-aft dimension of the housing 16 adjacent to the housing side 34.

As explained in greater detail below, the frame components 86a-86d are configured to define a series of cooperating, oppositely facing surfaces that capture different parts of the housing 16 to confine relative movement between the frame structure 88 and the housing 16 in all dimensions.

The components 86a-86d are connected to each other through the use of like, threaded fasteners 100. Each threaded fastener 100 has a turning head 102 with a configuration to cooperate with a customized fitting 104 on a security tool 106, as shown in FIG. 9. The fitting 104 is designed to make a keyed connection with the turning head 102. In this embodiment, each turning head 102 has a receiver 108 that is offset from the turning axis for the fastener 100. The security tool 106 may be custom engineered to avoid disassembly of the frame structure 88 by a would-be thief using conventional tools that are readily available.

With the security system 10 in the operative state, the vertical thickness T of the housing 16, between the top 38 and bottom 40, is captured between facing surfaces 110, 112, respectively on the components 86a, 86c.

Similarly, the fore-and-aft dimension D of the housing 16, between the front 30 and rear 32, is captured between surfaces 114, 116, respectively on the components 86b, 86d.

The captive arrangement of the part of the housing 16 between the surfaces 114, 116 prevents relative movement between that housing part and the frame structure 88 in a fore-and-aft direction. Similarly, with the part of the housing 16 captive between the surfaces 110, 112, relative up and down movement between that part of the housing 16 and the frame structure 88 is confined.

Relative lateral movement between the frame structure 88 and the housing 16 is confined by a plurality of different cooperating surfaces.

Figure 14:
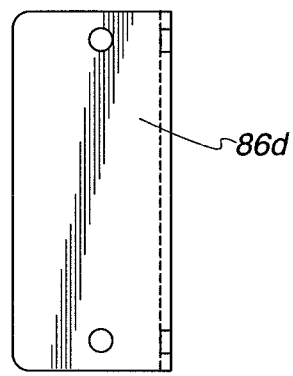
FIG. 14 is an enlarged, rear elevation view of a second component on the FIG. 8 frame structure.
Figure 15:
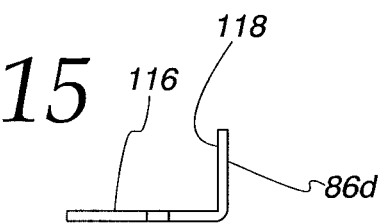
FIG. 15 is an enlarged, plan view of the component in FIG. 14.
Figure 16:
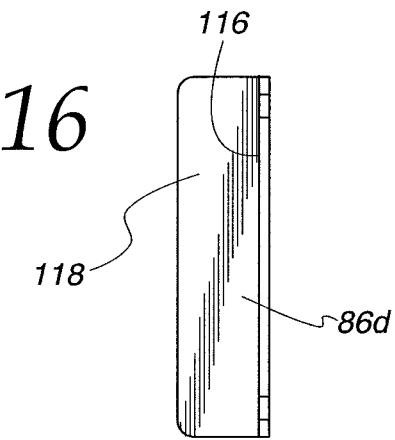
FIG. 16 is an enlarged, side elevation view of the component in FIGS. 14 and 15.

A laterally facing surface 118 on the housing part 86d abuts to the housing side 34 to confine lateral movement of the frame structure 88 towards the opposite housing side 36. As seen in FIGS. 14-16, the component 86d has a bent, right-angle shape to define the separate surfaces 116, 118.

The component 86a has depending posts 120a, 120b, 120c spaced from each other in a fore-and-aft direction.

The post 120a projects into the recessed/undercut region at 122 where the keypad 52 is located so that a surface 124 on the post 120a abuts to a portion of the framing edge 54 so that a part of the housing 16 is captive between the surfaces 124, 118 to confine lateral movement of the frame structure 88 relative to the housing 16.

The posts 120b, 120c project into the recessed/undercut region at 126 of the housing 16 where the electronic screen 46 is located so that surfaces 128, 130, respectively on the posts 120b, 120c, abut to a portion of the framing edge 50 to produce a captive arrangement in conjunction with the surface 118 that also confines relative lateral movement between the housing 16 and frame structure 88.

A separate surface 132 on the post 120c cooperates with the facing surface 116 on the component 86d to captively engage a part of the housing 16 therebetween to confine relative fore-and-aft movement between the housing 16 and the frame structure 88.

The component 86b has a discrete projecting subcomponent 134 that defines a surface 136 that also abuts to a part of the framing edge 54 to confine movement of the forward region of the frame structure 88 towards the housing side 34 with the security system 10 in the operative state.

As seen in FIG. 10, the component 86b also has a forwardly extending lip 138 to bear on the bottom 40 of the housing 16 and, in addition to rigidifying the connection of the component 86c by defining a vertical support therefor, defines a surface 140 facing the surface 110 on the component 86a to produce a captive arrangement to confine relative vertical movement between the frame structure 88 and housing 16.

To further rigidify the connection of the frame structure 88 to the housing 16, the subcomponent 134 has a cam surface 142 that is progressively wedged against the housing 16 at a front region thereof as the frame structure 88 is pressed downwardly to bring the surface 10 on the component 86a into close proximity with the upper surface area 90 on the top of the housing 16.

The components 86a-d may all be assembled on site. Otherwise some of the components 86a-d might be strategically pre-assembled, as by loosely connecting them, preparatory to a final tightening process over the housing 16.

As seen in FIG. 6, the component 86a has rectangular cutout region at 144 nominally matched to the underlying shape of the electronic screen 46, so as not to obstruct the same.

Similarly, a cutout region is provided at 146 so that the frame structure 88 does not substantially interfere with the operation of the keypad 52.

As also seen in FIG. 6, the frame structure 88 does not interfere with access to the stylus when staged in its holder 60.

The foregoing disclosure of specific embodiments is intended to be illustrative of the broad concepts comprehended by the invention.

The invention claimed is:

1. In combination:
a) an EPOS terminal configured to process a user input through at least one of a debit and a credit card,
the EPOS terminal comprising a housing with a reader for identifying information on a user's debit or credit card usable to carry out a transaction,
the housing having a top and bottom,
the housing having an external surface defining an original outer configuration including at the top of the housing at which there are user inputs; and
b) a security system comprising:
at least one component configured to be fixed to the housing with the security system in an operative state,
the at least one component directly overlying and projecting away from the housing external surface at the top of the housing to thereby substantially effectively alter a contour of the original outer configuration of the external surface at the top of the housing so as to block placement of a skimming skin at least nominally matched in shape to at least a portion of the original outer configuration of the external surface at the top of the housing, conformingly against the external surface at the top of the housing,
wherein the at least one component comprises at least first and second components that are connected to each other to captively engage the housing with the security system in the operative state,
wherein the housing external surface includes a peripheral surface area between top and bottom surface areas and with the security system in the operative state, the at least one component projects outwardly from the peripheral surface area, wherein with the security system in the operative state the at least one component extends continuously around so as to encircle a part of the housing.

2. The combination of claim 1 wherein the housing defines a slot to guide sliding movement of a debit or credit card in a predetermined manner to allow information on the credit or debit card to be identified by the reader.

3. The combination according to claim 1 wherein the at least one component comprises a plurality of joined components that cooperatively extend continuously around a rectangular space within which a part of the housing resides with the security system in the operative state.

4. The combination according to claim 1 wherein the EPOS terminal has a holder on the housing with a receptacle into which a stylus can be selectively releasably placed in a stored position and separated for use and the security system is configured so that in the operative state the security system does not obstruct placement of a stylus into, and removal of a stylus from, the housing receptacle.

5. The combination according to claim 4 wherein the EPOS terminal comprises an electronic screen and further in combination with a stylus that is configured to cooperate with the electronic screen to perform a processing operation through the electronic screen.

6. In combination:
a) an EPOS terminal configured to process a user input through at least one of a debit and a credit card,
the EPOS terminal comprising a housing with a reader for identifying information on a user's debit or credit card usable to carry out a transaction,
the housing having a top and bottom,
the housing having an external surface defining an original outer configuration including at the top of the housing at which there are user inputs; and
b) a security system comprising:
at least one component configured to be fixed to the housing with the security system in an operative state,
the at least one component directly overlying and projecting away from the housing external surface at the top of the housing to thereby substantially effectively alter a contour of the original outer configuration of the external surface at the top of the housing so as to block placement of a skimming skin at least nominally matched in shape to at least a portion of the original outer configuration of the external surface at the top of the housing, conformingly against the external surface at the top of the housing,
wherein the housing has a front and rear and laterally spaced sides and with the security system in the operative state: a) a first part of the housing is captive between oppositely facing surfaces on the at least one component to confine relative lateral movement between the housing and a first part of the security system; b) a second part of the housing is captive between oppositely facing surfaces on the at least one component to confine relative fore-and-aft movement between the housing and a second part of the security system; and c) a third part of the housing is captive between oppositely facing surfaces on the at least one component to confine relative up and down movement between the housing and a third part of the security system.

7. The combination according to claim 6 wherein the EPOS terminal comprises an electronic screen with a framing edge around the electronic screen and the first part of the housing is bounded by a part of the framing edge.

8. The combination according to claim 7 wherein the first part of the housing is bounded by a surface at one side of the housing.

9. The combination according to claim 6 wherein the EPOS terminal comprises an electronic screen with a framing edge around the electronic screen and a keypad with a framing edge around the keypad and the second part of the housing is defined between parts of each of the framing edges around the electronic screen and the keypad.

10. The combination according to claim 6 wherein the third part of the housing is defined between oppositely facing top and bottom surfaces of the housing.

11. The combination according to claim 6 wherein the second part of the housing is defined between oppositely facing front and rear surfaces of the housing.

12. The combination according to claim 6 wherein the housing has an undercut region at the top of the housing at which a keypad is formed bounded by a framing edge and the first part of the housing is bounded by a part of the framing edge.

13. The combination according to claim 12 wherein the first part of the housing is bounded by a surface at one side of the housing.

14. In combination:
a) an EPOS terminal configured to process a user input through at least one of a debit and a credit card,
the EPOS terminal comprising a housing with a reader for identifying information on a user's debit or credit card usable to carry out a transaction,
the housing having a top and bottom,
the housing having an external surface defining an original outer configuration including at the top of the housing at which there are user inputs; and
b) a security system comprising:
at least one component configured to be fixed to the housing with the security system in an operative state,
the at least one component directly overlying and projecting away from the housing external surface at the top of the housing to thereby substantially effectively alter a contour of the original outer configuration of the external surface at the top of the housing so as to block placement of a skimming skin at least nominally matched in shape to at least a portion of the original outer configuration of the external surface at the top of the housing, conformingly against the external surface at the top of the housing,
wherein the security system comprises a plurality of components fixed directly together using threaded fasteners.

15. The combination according to claim 14 wherein the threaded fasteners each has a turning head with a configuration to cooperate with a security tool having a customized fitting to make a keyed connection with the turning head.

16. The combination according to claim 15 further in combination with the security tool.

17. In combination:
a) an EPOS terminal configured to process a user input through at least one of a debit and a credit card,
the EPOS terminal comprising a housing with a reader for identifying information on a user's debit or credit card usable to carry out a transaction,
the housing having an external surface defining an original outer configuration at which there are user inputs; and
b) a security system comprising:
at least one component configured to be fixed to the housing with the security system in an operative state, the at least one component directly overlying and projecting away from the housing external surface to thereby substantially effectively alter a contour of the original outer configuration of the external surface so as to block placement of a skimming skin at least nominally matched in shape to at least a portion of the original outer configuration of the external surface, conformingly against the external surface, wherein the at least one component comprises a plurality of components that are connected to each other to define a fixed structure to captively engage the housing with the security system in the operative state so that the housing is blocked from moving relative to the fixed structure in transverse directions.

\* \* \* \* \*